United States Patent
Alowersson et al.

(10) Patent No.: US 6,754,742 B1
(45) Date of Patent: Jun. 22, 2004

(54) QUEUE MANAGEMENT SYSTEM HAVING ONE READ AND ONE WRITE PER CYCLE BY USING FREE QUEUES

(75) Inventors: Jonas Alowersson, Malmö (SE); Per Andersson, Lund (SE); Bertil Roslund, Lund (SE); Patrik Sundström, Osby (SE)

(73) Assignee: SwitchCore AB, Lund (SE)

( * ) Notice: Subject to any disclaimer, the term of this patent is extended or adjusted under 35 U.S.C. 154(b) by 0 days.

(21) Appl. No.: 09/428,285

(22) Filed: Oct. 27, 1999

(30) Foreign Application Priority Data

Oct. 28, 1998 (SE) ................................................ 9803694

(51) Int. Cl.[7] .......................... G06F 12/00; G06F 13/00; H04L 12/28; H04J 3/02
(52) U.S. Cl. ............................. 710/53; 710/52; 710/54; 370/232; 370/389; 370/398; 370/412; 370/418; 370/429
(58) Field of Search .............................. 710/54, 52, 53; 370/232, 429, 418, 389, 412, 398

(56) References Cited

U.S. PATENT DOCUMENTS

| | | | |
|---|---|---|---|
| 5,016,248 A | 5/1991 | Kudoh | 370/413 |
| 5,390,184 A * | 2/1995 | Morris | 370/353 |
| 5,463,622 A | 10/1995 | Keller et al. | 370/399 |
| 5,640,389 A * | 6/1997 | Masaki et al. | 370/418 |
| 5,828,903 A | 10/1998 | Sethuram et al. | 710/53 |
| 5,850,395 A * | 12/1998 | Hauser et al. | 370/398 |
| 6,009,078 A * | 12/1999 | Sato | 370/232 |
| 6,137,807 A * | 10/2000 | Rusu et al. | 370/429 |
| 6,359,891 B1 * | 3/2002 | Bergantino et al. | 370/398 |

FOREIGN PATENT DOCUMENTS

| | | | |
|---|---|---|---|
| EP | 0 828 403 A1 | 8/1997 | ........... H04Q/11/04 |
| JP | 05336153 A * | 12/1993 | |

* cited by examiner

Primary Examiner—Jeffrey Gaffin
Assistant Examiner—Tammara Peyton
(74) Attorney, Agent, or Firm—Coudert Brothers LLP

(57) ABSTRACT

The invention relates to a buffer memory, method and a buffer controller for queue management usable in an ATM switch. An object of the invention is to achieve a high frequency throughput of data cells in the buffer memory. This object is achieved by using a buffer memory which is organized as 256*(424+8) SRAM-cells. The memory is used for holding ten queues, one for each incoming channel and two free-queues containing idle cells.

11 Claims, 2 Drawing Sheets

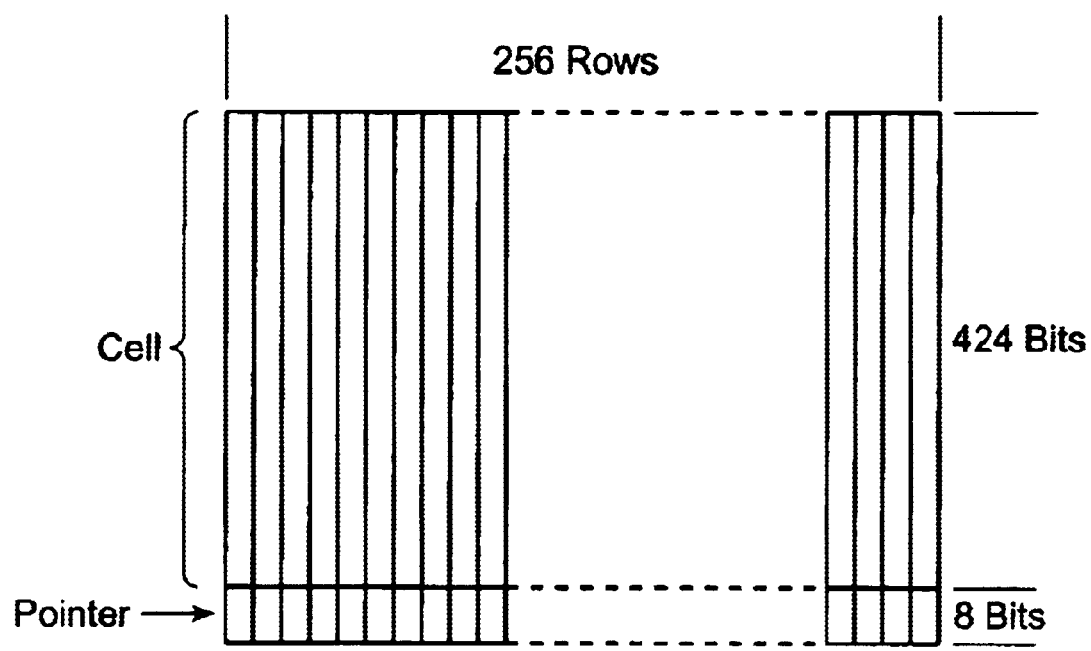
FIG._1

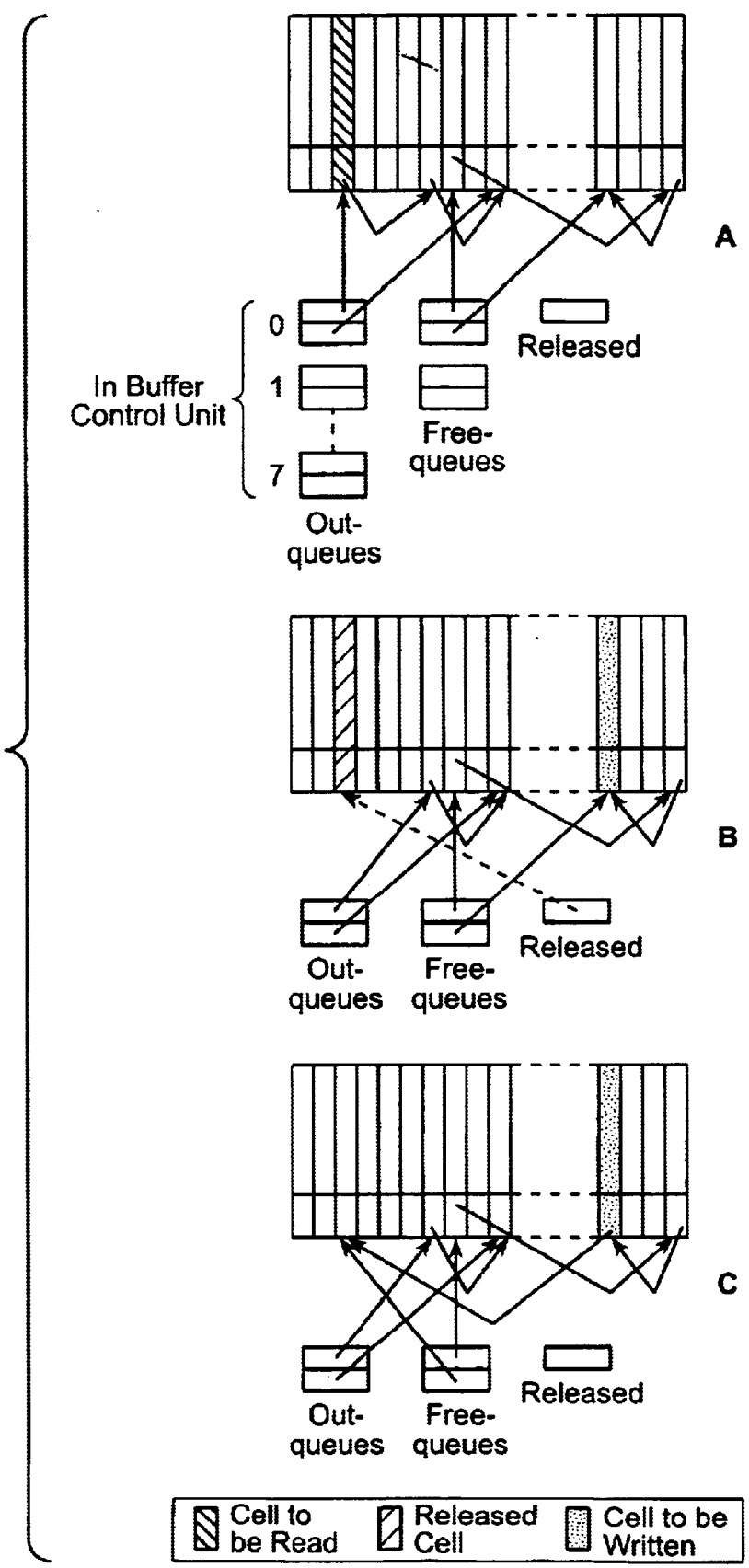
FIG._2

QUEUE MANAGEMENT SYSTEM HAVING ONE READ AND ONE WRITE PER CYCLE BY USING FREE QUEUES

FIELD OF INVENTION

The present invention relates to a buffer memory, a method and a buffer controller for queue management, and more particularly, to a buffer memory usable in an ATM switch and having only one read and one write port.

BACKGROUND OF THE INVENTION

It is generally desirable to achieve a high frequency throughput of data cells in a buffer memory. However, for reasons of keeping the complexity of such a memory moderate, it is desirable to limit the number of ports of the memory. A memory with only one read port and one write port allows one read operation and one write operation per cycle which implies that the memory itself is required to operate at a high frequency in order to manage the high bandwidth. This requires the buffer memory to be pipelined.

An object of the present invention is to enable a high frequency output in a pipelined buffer memory with only one read and write per cycle, by means of free-queues and a tailored queue management algorithm. The relation between the pipelining of the memory and the number of free queues is such that there is one additional free-queue per pipeline stage in the buffer. This object is achieved by means of a buffer memory, a method for queue management and a buffer controller.

SUMMARY OF THE DISCLOSURE

The above object is achieved by means of a buffer memory, a method for queue management and a buffer controller as claimed in claims 1, 7 and 10, respectively.

Using high operating frequencies means that it is necessary to pipeline the reading. In a preferred embodiment of the invention this pipelining is enabled by using two free-queues, that is one queue is working while the other is updated.

BRIEF DESCRIPTION OF THE DRAWINGS

The present invention will now be described in more detail with reference to preferred embodiments of the invention, given only by way of examples, and illustrated in the accompanying drawings in which:

FIG. 1 is a buffer memory according to the invention; and

FIG. 2 discloses three steps of the buffer algorithm.

DETAILED DESCRIPTION OF AN EMBODIMENT OF THE INVENTION

The present invention relates to a buffer memory usable in an ATM switch. Data packets or cells are forwarded through the switch on a number of channels, here eight channels. At the core of the switch there is a buffer memory through which all the cells are transmitted. The operations of the switch are controlled by a buffer controller. In order to minimise the complexity of the switch, it is desirable to have only one read and one write port of the buffer memory. This means that a cycle has only one read and one write operation leading to a high operating frequency (approximately 188 MHz), and a delay requiring the memory to be pipelined. A pipelined memory is capable of handling a number of cells simultaneously inasmuch as it takes a number of cycles before a cell has passed the memory.

The ATM switch requires that a read and a write of a cell is performed in each cycle. If there is no data to be sent, idle cells are transmitted. In the present invention, free-queues are filled with idle cells and utilised to provide the idle cells. Since the memory is pipelined, the buffer requires two free-queues, such that one is available while the other is updated.

First, it will be helpful to explain the mechanism of the queue system. The buffer memory comprises rows of bits arranged in a queue system. Generally, a queue system consists of at least two queues. In turn, a queue consists of a linked list of elements, each including a data portion and a pointer to the next element. In the present invention an element corresponds to a row. Each available element is located in a queue. The last element of each queue is reserved to receive a cell. In other words, the pointer of the last element points to a row available for writing. It should be noted that no external memory is required to keep a linked list of the pointers but all pointers are stored in the buffer itself.

The memory contains ten queues, one queue for each channel (i.e. eight) and two free-queues, as will be explained below. The ATM switch includes a control unit keeping track of the head and tail of each queue, that is the address of the first and last elements, respectively, of each queue and also temporarily stores the location of a just released row which is to be put as an available element at the tail of a queue.

A cell access involves only one read or write of the whole cell. An operation involves exactly one delete and one insert. A delete consists of reading exactly one cell and updating of the queue header. An insert consists of writing exactly one cell and updating of the queue tail. The mechanism is tailored to a memory allowing only one read and write per cycle.

In a preferred embodiment, the buffer memory is organised as 256*(424+8) SRAM (Static Random Access Memory) cells as shown in FIG. 1. This space is used for holding the ten queues, one for each incoming channel and two containing free cells, which are filled with idle-cells. At least one queue is associated with each outgoing channel (port). The eight bits trailing the ATM cell are used as the pointer to the next cell in the queue. The memory is capable of performing one read and one write during one cycle of the buffer controller.

The total size of the buffer memory may be varied and depends on the available space on the chip. In principle, the queue length is not limited and the memory is used more efficiently because of the static nature of the traffic by not reserving space for each channel. However, the queue length can be limited to prevent one channel from blocking the whole memory but, in theory, all channels share the entire memory.

The algorithm of the buffer controller is very simple, and the basic idea is that every queue has reserved a row of the memory for the next cell to be written. In other words, the last element (tail) of each queue is available for writing. The algorithm works in the following way in one cycle, i.e. one read and one write operation.

Read operation

All the eight channels are scanned in turn for data to be transmitted. Look at the queue for the current channel. If the queue contains any data pick the first cell and send it, otherwise pick an idle cell from the current free-queue and send it.

Remove the row that contained the cell just sent from the queue, that is update the header of the queue in question. Store the location address of the row just sent which is now free.

Write operation

Write an incoming cell in the reserved row of the appropriate channel queue, if data cell, or free-queue, if idle cell. The queue tail is updated by writing the stored address of the free row in the pointer field of the former reserved row, thus reserving the free row to be written as the next item in the queue.

An example of the algorithm will now be given with reference to FIG. 2. A cell access or buffer cycle consists of one read and one write operation. In the example an outgoing cell is read from queue 0 and incoming idle cell is written in a free queue. The out-queues are represented by head and tail pointers. The pointers of channel 0 are pointing to the first and last elements of the queue and the intervening elements are linked by the pointers contained in each row as illustrated by angled arrows. It will be seen that channel 0 holds three elements the last of which being the reserved element or row.

Similarly, the (two) free-queues are also represented by head and tail pointers while the box labeled Released contains the pointer of an element just read and sent. The registers holding the head and tail pointers of the out-queues and the free-queues as well as the pointer Released are located in the control unit.

The FIG. 2 discloses actions taken when an idle cell is coming in and a data cell is going out on channel 0. Thus, in step A of FIG. 2, the queue of channel number 0 is not empty, and the row referred to by the queue-header is read.

In step B of FIG. 2, the row with the cell just read is released and the header of the out-queue 0 is updated to refer to next item. At the same time, the address of the now free row is stored in the box Released as shown by the broken arrow.

In step C of FIG. 2, the incoming cell (idle-cell) is written to the reserved row referred to by the current free-queue's tail pointer and the pointer thereof is updated to point to the new reserved row, and the released free row (from queue 0) is put at the end of the free queue to become the new reserved row.

If the incoming cell is a data cell, the same operation would be made on an in-queue with the relevant number.

Thus, it will be seen that each cycle contains two pointer operations: read: update head pointer of a queue (in-queue if data, free queue if idle); write: update tail pointer of a queue (out-queue if data, free queue if idle).

The head pointer of the respective queue subjected to a read is updated with the pointer of the previous first row to point to the next row in the queue, while the tail pointer of the respective queue subjected to a write is updated with the pointer of the previously released row (temporarily stored in Released) which is now available to be written. This algorithm keeps the number of operations at a minimum.

If the operating frequency is very high, the memory is required to be pipelined. Then the buffer requires two free-queues, such that one is available while the other is updated.

It would be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced therein.

What is claimed is:

1. A buffer memory organised in rows for temporarily storing data, holding a number of queues, one for each channel and at least one free-queue containing idle cells that are transmitted in an access cycle if there is no data to be sent during said cycle, characterized in that said buffer memory is organised as a matrix containing a number of rows, each row containing a cell of data and a number of bits of pointer data, respectively, which pointer data points to the next cell in the queue and in that the last row of each said queue is available for the next cell to be written.

2. A buffer memory as claimed in claim 1, characterized in that two free-queues are used filled with idle cells.

3. A buffer memory as claimed in claims 1 or 2, characterized in that it is organised as a matrix of RAM-cells, preferable SRAM-cells.

4. A buffer memory as claimed in claim 1, characterized in that it is used for holding ten queues.

5. A buffer memory as claimed in claim 1, characterized in that it is organised as a matrix containing 256 rows, each row containing 424 bits of data and 8 bits of pointer data, respectively.

6. A method for queue management in a buffer memory for holding a number of queues, one for each channel and at least one free-queue, filled with idle-cells that are transmitted in an access cycle if there is no data to be sent during said cycle, said buffer memory organised as a matrix containing a number of rows, each row containing a cell of data and a number of bits of pointer data, respectively, which pointer data points to the next cell in the queue, the last row of each of the queue being available for the next cell to be written, characterized in that an access cycle contains two pointer operations:

read: update a head pointer of a queue;

write: update a tail pointer of a queue.

7. A method for queue management in a buffer memory for holding a number of queues, one for each channel and at least one free-queue, filled with idle-cells that are transmitted in an access cycle if there is no data to be sent during said cycle, said buffer memory organized as a matrix containing a number of rows, each row containing a cell of data and a number of bits of pointer data, respectively, which pointer data points to the next cell in the queue, the last row of each of the queue being available for the next cell to be written, characterized in that an access cycle contains two pointer operations:

read: update a head pointer of a queue;

write: update a tail pointer of a queue; wherein the head pointer of the respective queue subjected to a read is updated with the pointer of the previous first row to point to the next row in the queue, while the tail pointer of the respective queue subjected to a write is updated with the pointer of the previously released row which is now available to be written.

8. A method as claimed in claim 7, characterized by the steps of looking at the queue for the current channel, if the queue contains any data, picking the first cell and sending it, otherwise picking an idle cell from the current free-queue and sending it, removing the row that contained the cell just sent from the queue, storing the location address of the row just sent, writing an incoming cell in the reserved row of the appropriate channel queue, if data cell, or free-queue if idle cell, and writing the stored address of the free row in the pointer field of the former reserved row, thus reserving the free row to be written as the next item in the queue.

9. A method as claimed in claims 5, 6, 7 or 8, characterized in that it is implemented as an algorithm in a buffer controller.

10. A buffer controller for controlling memory accesses in a buffer memory organised as a matrix with a number of data cells, characterized in that: it performs one reading and one writing in the buffer memory during one cycle of the buffer controller; the reading of the buffer memory is pipelined in order to be able to use a high operational frequency, e.g. 188 MHz; and, for achieving pipelining, two free-queues are used, wherein one free-queue is working while the other is being updated and wherein each free-queue contains idle cells that are transmitted in an access cycle if there is no data to be sent during said access cycle.

11. A method for queue management in a buffer memory for holding a number of queues, one for each channel and at least one free-queue, filled with idle-cells that are transmitted in an access cycle if there is no data to be sent during said cycle, said buffer memory organized as a matrix containing a number of rows, each row containing a cell of data and a number of bits of pointer data, respectively, which pointer data points to the next cell in the queue, the last row of each of the queue being available for the next cell to be written, characterized in that an access cycle contains two pointer operations:

read: update a head pointer of a queue;

write: update a tail pointer of a queue, wherein the head pointer of the respective queue subjected to a read is updated with the pointer of the previous first row to point to the next row in the queue, while the tail pointer of the respective queue subjected to a write is updated with the pointer of the previously released row which is now available to be written; and characterized by the steps of:

looking at the queue for the current channel, and if the queue contains any data, picking the first cell and sending it, otherwise picking an idle cell from the current free-queue and sending it;

removing the row that contained the cell just sent from the queue;

storing the location address of the row just sent;

writing an incoming cell in the reserved row of the appropriate channel queue, if data cell; or free-queue if idle cell, and writing the stored address of the free row in the pointer field of the former reserved row, thus reserving the free row to be written as the next item in the queue.

* * * * *